(12) United States Patent
Zehler et al.

(10) Patent No.: US 9,038,908 B2
(45) Date of Patent: May 26, 2015

(54) METHODS AND SYSTEMS FOR OPTIMIZING VISUAL DATA COMMUNICATION

(71) Applicant: XEROX CORPORATION, Norwalk, CT (US)

(72) Inventors: Peter J. Zehler, Penfield, NY (US); Gavan L. Tredoux, Penfield, NY (US); Premkumar Rajendran, Webster, NY (US); Zhigang Fan, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 132 days.

(21) Appl. No.: 13/860,296

(22) Filed: Apr. 10, 2013

(65) Prior Publication Data

US 2014/0307167 A1  Oct. 16, 2014

(51) Int. Cl.
| | |
|---|---|
| *G06K 7/10* | (2006.01) |
| *H04N 5/04* | (2006.01) |
| *H04N 21/414* | (2011.01) |
| *H04N 21/422* | (2011.01) |
| *H04N 21/478* | (2011.01) |

(52) U.S. Cl.
CPC ........... *H04N 5/04* (2013.01); *H04N 21/41407* (2013.01); *H04N 21/42224* (2013.01); *H04N 21/478* (2013.01)

(58) Field of Classification Search
CPC ....... G03F 3/01; G03F 3/1208; G03F 3/1284; G03F 17/22; G03F 3/1204; G03F 3/122; G03F 3/1225; G03F 3/1226; G03F 3/1244; G03F 3/1245; G03F 3/1247; G03F 3/1285; G03F 3/1288; G03F 3/1292; H04L 65/60; H04L 67/16; H04L 67/303
USPC ............. 235/462.01–462.45, 472.01, 472.02, 235/472.03
See application file for complete search history.

(56) References Cited

U.S. PATENT DOCUMENTS

| | | | | |
|---|---|---|---|---|
| 4,839,829 | A  * | 6/1989 | Freedman ...................... | 715/751 |
| 7,575,168 | B2 | 8/2009 | Suomela et al. | |
| 2009/0301324 | A1 * | 12/2009 | Perault et al. ................. | 101/126 |
| 2010/0272193 | A1 | 10/2010 | Khan et al. | |
| 2012/0230315 | A1 * | 9/2012 | Chang et al. .................. | 370/338 |
| 2012/0272147 | A1 * | 10/2012 | Strober ......................... | 715/716 |
| 2012/0272148 | A1 * | 10/2012 | Strober ......................... | 715/716 |
| 2013/0124759 | A1 * | 5/2013 | Strober ......................... | 709/248 |
| 2014/0300932 | A1 * | 10/2014 | Hojo ............................. | 358/1.15 |

* cited by examiner

*Primary Examiner* — Thien M Le
(74) *Attorney, Agent, or Firm* — MH2 Technology Law Group LLP

(57) ABSTRACT

A system and method for transmitting visual data by displaying a synchronization video that includes synchronization code sequences on a first device, capturing the synchronization video using a video camera of a second device, parsing and decoding the synchronization code sequences on the second device, displaying an indication of which of the synchronization code sequences are compatible for visual data transmission on the second device, receiving a selected synchronization code sequence of the synchronization code sequences on the first device, and displaying a data code sequence corresponding to the selected synchronization code sequence on the first device, wherein the data code sequence includes encoded data, and capturing and decoding the data code sequence on the second device.

18 Claims, 8 Drawing Sheets

METHODS AND SYSTEMS FOR OPTIMIZING VISUAL DATA COMMUNICATION

TECHNICAL FIELD

The present disclosure relates generally to methods, systems, and computer-readable media for optimizing visual data communication between devices.

BACKGROUND

Transferring data between devices typically requires a setup process where one or both devices are configured with specific network parameters. These steps are often not pre-configured, and can delay, restrict, or even prevent data transmission. For example, a scanning device can be connected to a wireless network, and a mobile device may need to connect to the wireless network with appropriate credentials to access scanned documents. If a user of the mobile device does not know which wireless network to connect to or the appropriate credentials, the user may not be able to access the scanned documents.

One potential solution is to transfer data visually using machine-readable static labels, then a device with image capture functionality can capture the data without a setup step, and only a direct line-of-sight is required. However, traditional machine-readable static labels are only capable of storing small amounts of data. For example, a traditional machine-readable static label likely could not store enough data to allow for the transmission of scanned document information.

Therefore, visual data communication can be improved by methods and systems that optimize machine-readable visual data and visual data communication parameters.

SUMMARY

The present disclosure relates generally to methods, systems, and computer readable media for providing these and other improvements to visual data communication.

In some embodiments, to transmit a specified data file, a computing device can present a synchronization video on a display screen. The synchronization video can include multiple machine-readable visual code sequences containing encoded data (hereinafter, "synchronization code sequences") displayed using different parameters. The computing device can then receive a selection of one of the synchronization code sequences. The computing device can display a machine-readable visual code sequence containing encoded data representing the specified data file (hereinafter, "data code sequence") using the parameters associated with the selected synchronization code sequence.

In further embodiments, to receive a specified data file, a computing device can receive a sequence of images from a video camera, and the sequence of images can include multiple synchronization code sequences displayed using different parameters. The computing device can process the synchronization code sequences and determine which synchronization code sequences are fully processed, which synchronization code sequences cannot be fully processed, and/or which synchronization code sequence uses parameters that are optimal for data transmission. The computing device can then display the results of such a determination on a display screen. The computing device can receive a new sequence of images from the video camera, where the new sequence of images includes a data code sequence, and the computing device can process the data code sequence.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
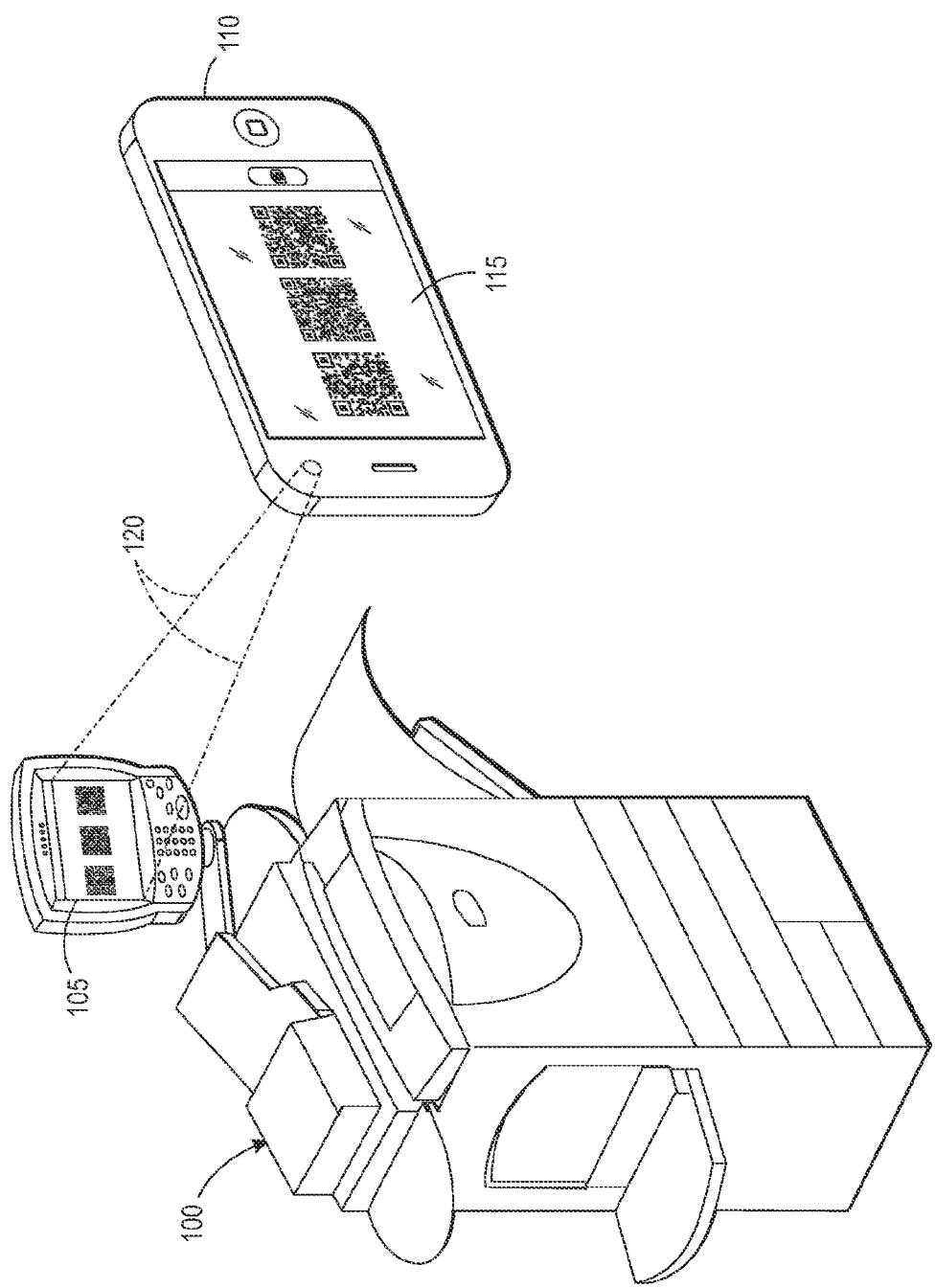
FIG. 1 is a diagram depicting an exemplary visual data communication system, consistent with certain disclosed embodiments.

The following detailed description refers to the accompanying drawings. Wherever possible, the same reference numbers are used in the drawings and the following description refers to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 is a diagram depicting an exemplary visual data communication system, consistent with certain disclosed embodiments. As depicted in FIG. 1, device 100 can represent a visual data emitter. In some embodiments, device 100 can be a multifunction printer device, capable of performing multiple functions including, but not limited to printing, scanning, and faxing (hereinafter, "MFD"). In further embodiments, device 100 can represent any type of device that can be used to emit and/or transmit data, such as a scanner, a fax machine, a data kiosk, a data vending machine, a mobile device, etc.

Device 100 can be capable of sending information to display screen 105. Display screen 105 can be connected to and/or integrated with device 100. Display screen 105 can represent any type of two-dimensional video display capable of displaying synchronization code sequences and data code sequences (generally, "code sequences"), as described herein. For example, display screen 105 can represent a liquid crystal display (hereinafter, "LCD") screen.

In some embodiments, device 100 can be further capable of receiving information from display screen 105. For example, display screen 105 can be a touchscreen, and can detect input via a direct or indirect touch on display screen 105. A user can interact with device 100 using the touchscreen functionality of display screen 105. For example, a user can use the touchscreen functionality to select an optimal synchronization code sequence from a synchronization video, scroll though possible synchronization code sequences, select a specific data file to transmit, select a desired functionality from device 100, etc.

Additionally or alternatively, device 100 and/or display screen 105 can receive user input from sources such as, but not limited to, a keyboard, a mouse, a motion sensor, buttons assigned to specific functions, etc.

As further depicted in FIG. 1, device 110 can represent a visual data receiver. In some embodiments, device 110 can be a mobile device, such as a smartphone or a tablet computer. In further embodiments, device 110 can represent any type of device that can be used to receive data, such as an MFD, a printer, a fax machine, etc.

Device 110 can be capable of receiving information from a video camera (not pictured). The video camera can be connected to and/or integrated with device 110. The video camera can represent any type of image capture device capable of capturing code sequences displayed on display screen 105. As depicted in FIG. 1, lines 120 represent a line of sight for the video camera directed to capture a video of display screen 105.

In various embodiments, the video camera can capture video in a full range of different resolutions and different frame rates. In some embodiments, the video camera can capture high-definition video in, for example, a 1080p format with a 1920×1080 pixel resolution at 30 frames per second, while, in further embodiments, the video camera may only capture standard-definition and/or low-definition video in, for example, a 576i format with a 720×576 resolution at 24 frames per second.

Device 110 can be further capable of sending information to display screen 115. Display screen 115 can be connected to and/or integrated with device 110. Display screen 115 can represent any type of two-dimensional video display. For example, display screen 105 can represent a LCD screen.

Device 110 can further be capable of receiving information from display screen 115. For example, display screen 115 can be a touchscreen, and can detect input via a direct or indirect touch on display screen 115. A user can interact with device 110 using the touchscreen functionality of display screen 115. For example, a user can use the touchscreen functionality to initiate the video camera, initiate a visual data transmission application, scroll through possible code sequences, etc.

In an exemplary embodiment, device 100 can represent a MFD and device 110 can represent a smartphone. A user can scan a document using the scanning functionality of the MFD to create a scanned document image. Device 100 can display a synchronization video on display screen 105. The user, using device 110, can capture the synchronization video using a video camera integrated with device 110. Device 110 can then process individual synchronization code sequences from the synchronization video and determine which synchronization code sequences could not be fully processed. Device 110 can then select an optimal synchronization code sequence from among the fully processed synchronization code sequences and display an indication of the optimal synchronization code sequence to the user on display screen 115. The user can then select the optimal synchronization code sequence displayed on display screen 105 using the touchscreen functionality of display screen 105. Based on the selection, device 100 can display a data code sequence containing the scanned document image, and the user can capture the data code sequence using the video camera of device 110. After capturing the full data code sequence, device 110 can process the data code sequence, extract the scanned document image, and display the scanned document image on display screen 115 and/or store the scanned document image in memory.

In an additional embodiment, device 100 can represent a smartphone and device 110 can represent a MFD. A user can have a document image stored on device 100 and can activate a visual data transmission application on device 100. Device 100 can display a synchronization video on display screen 105. The user can activate a visual data receiver process on device 110, and can present the synchronization video on display screen 105 to a video camera connected to device 110. Accordingly, device 110 can capture the synchronization video. Device 110 can then process individual synchronization code sequences from the synchronization video and determine which synchronization code sequences could not be fully processed. Device 110 can then select an optimal synchronization code sequence from among the fully processed synchronization code sequences and display an indication of the optimal synchronization code sequence to the user on display screen 115. The user can then select the optimal synchronization code sequence displayed on display screen 105 using the touchscreen functionality of display screen 105. Based on the selection, device 100 can display a data code sequence containing the scanned document image, and the user can present the data code sequence to the video camera connected to device 110. After capturing the full data code sequence, device 110 can process the data code sequence, extract the scanned document image, and print the scanned document image.

In a further embodiment, device 100 can represent a data vending machine and device 110 can represent a smartphone. Device 100 can have a data file stored in memory, such as, for example, a digital audio file. A user can use display screen 105 to select to purchase the digital audio file. After the purchase is complete, device 100 can display a synchronization video on display screen 105. The user, using device 110, can capture the synchronization video using a video camera integrated with device 110. Device 110 can then process individual synchronization code sequences from the synchronization video and determine which synchronization code sequences could not be fully processed. Device 110 can then select an optimal synchronization code sequence from among the fully processed synchronization code sequences and display an indication of the optimal synchronization code sequence to the user on display screen 115. The user can then select the optimal synchronization code sequence displayed on display screen 105 using the touchscreen functionality of display screen 105. Based on the selection, device 100 can display a data code sequence containing the purchased data file, and the user can capture the data code sequence using the video camera of device 110. After capturing the full data code sequence, device 110 can process the data code sequence, extract the data file, and store the data file, which can be subsequently accessed by the user.

Those skilled in the art will appreciate that the above-described system and examples are exemplary only, and any system capable of performing the embodiments disclosed herein can be utilized.

Figure 2A:
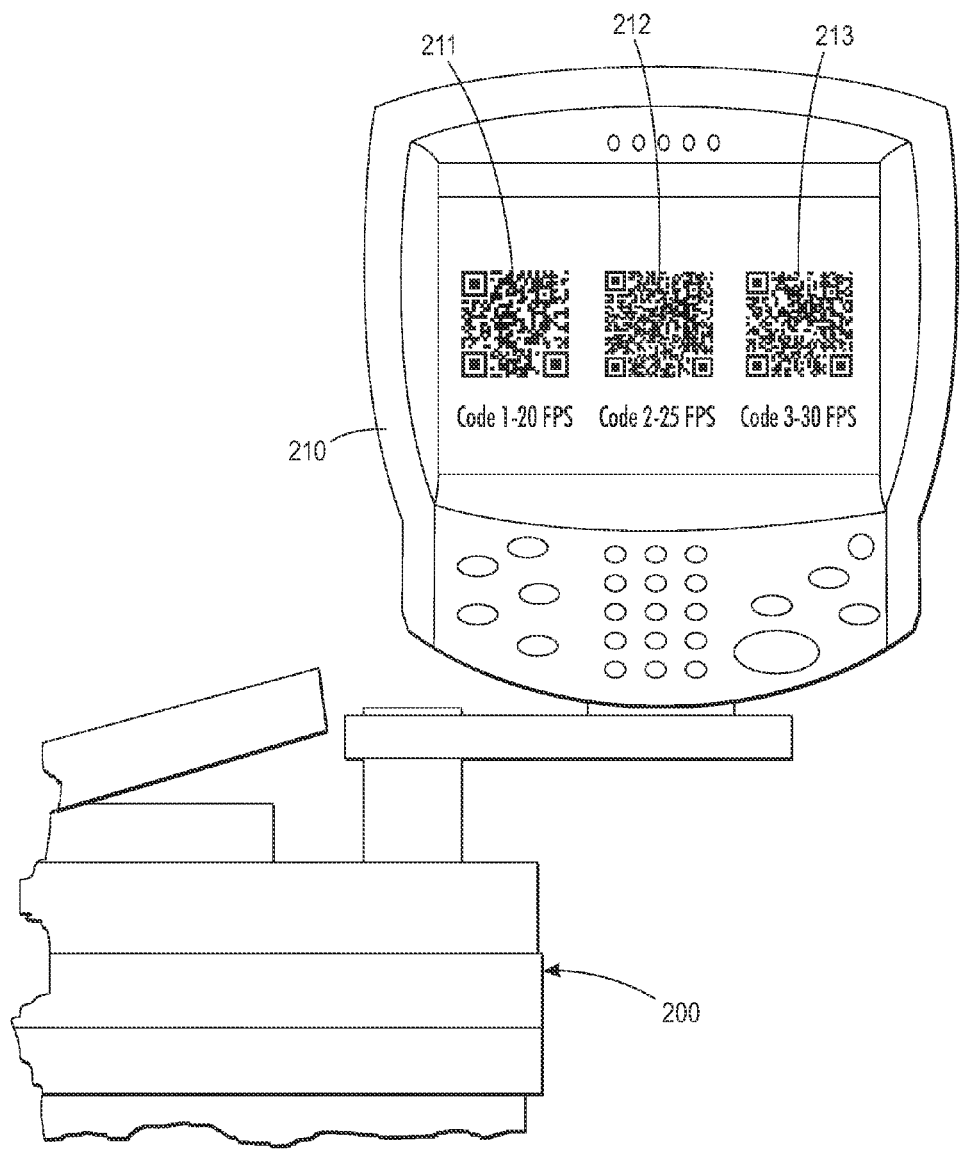
FIG. 2A is a diagram depicting an exemplary display screen of a visual data emitter, consistent with certain disclosed embodiments.

FIG. 2A is a diagram depicting an exemplary display screen of a visual data emitter, consistent with certain disclosed embodiments. As depicted in FIG. 2A, device 200 is a visual data emitter, similar to device 100 in FIG. 1. Device 200 can be connected to display screen 210, similar to display screen 105 in FIG. 1.

As depicted in FIG. 2A display screen 210 is currently displaying a still frame from a synchronization video. The still frame from the synchronization video includes three code sequence frames 211, 212, and 213.

Code sequence frame 211 can represent a single frame from a first synchronization code sequence. For example, the first synchronization code sequence can refresh at 20 code sequence frames per second and can include code sequence frame 211. Accordingly, as depicted in FIG. 2A, code sequence frame 211 can be optionally captioned with the text "Code 1-20 FPS." Therefore, a video camera capable of capturing images at above 20 frames per second may be able to capture each code sequence frame in the first synchronization code sequence.

Further, in some embodiments, the first synchronization code sequence can be presented in a unique resolution, such as a low resolution, and/or in a particular code sequence format capable of being captured by a low resolution video camera.

Code sequence frame 212 can represent a single frame from a second synchronization code sequence. For example, the second synchronization code sequence can refresh at 25 code sequence frames per second and can include code sequence frame 212. Accordingly, as depicted in FIG. 2A, code sequence frame 212 can be optionally captioned with the text "Code 2-25 FPS." Therefore, a video camera capable of capturing images at above 25 frames per second may be able to capture each code sequence frame in the second synchronization code sequence.

Further, in some embodiments, the second synchronization code sequence can be presented in a unique resolution, such as a standard or medium resolution, and/or in a particular code sequence format capable of being captured by a standard or medium resolution video camera.

Code sequence frame 213 can represent a single frame from a third synchronization code sequence. For example, the third synchronization code sequence can refresh at 30 code sequence frames per second and can include code sequence frame 213. Accordingly, as depicted in FIG. 2A, code sequence frame 213 can be optionally captioned with the text "Code 3-30 FPS." Therefore, a video camera capable of capturing images at above 30 frames per second may be able to capture each code sequence frame in the third synchronization code sequence.

Further, in some embodiments, the third synchronization code sequence can be presented in a unique resolution, such as a high resolution, and/or in a particular code sequence format only capable of being captured by a high resolution video camera.

Those skilled in the art will appreciate that the above-described diagram is exemplary only, and additional screen configurations and synchronization code sequences may be utilized. For example, in some embodiment, more than three synchronization code sequences may be displayed in the synchronization video. Further, the synchronization video may include additional synchronization code sequences that are not concurrently displayed on the display screen, and a user may be able to scroll through possible synchronization code sequences before capturing the synchronization code sequences with a video camera.

Additionally or alternatively, device 200 may be capable of using display screen 210 to display multiple synchronization videos. For example, a user can select a particular range of possible synchronization code sequences based on known video camera or mobile device specifications, and device 200 may only display synchronization code sequences within the particular range. As an additional example, the user may indicate that a visual data receiver was not able to process any synchronization code sequences from a first synchronization video. Accordingly, device 200 may then display a new synchronization video that includes synchronization code sequences with lower frame rates.

Figure 2B:
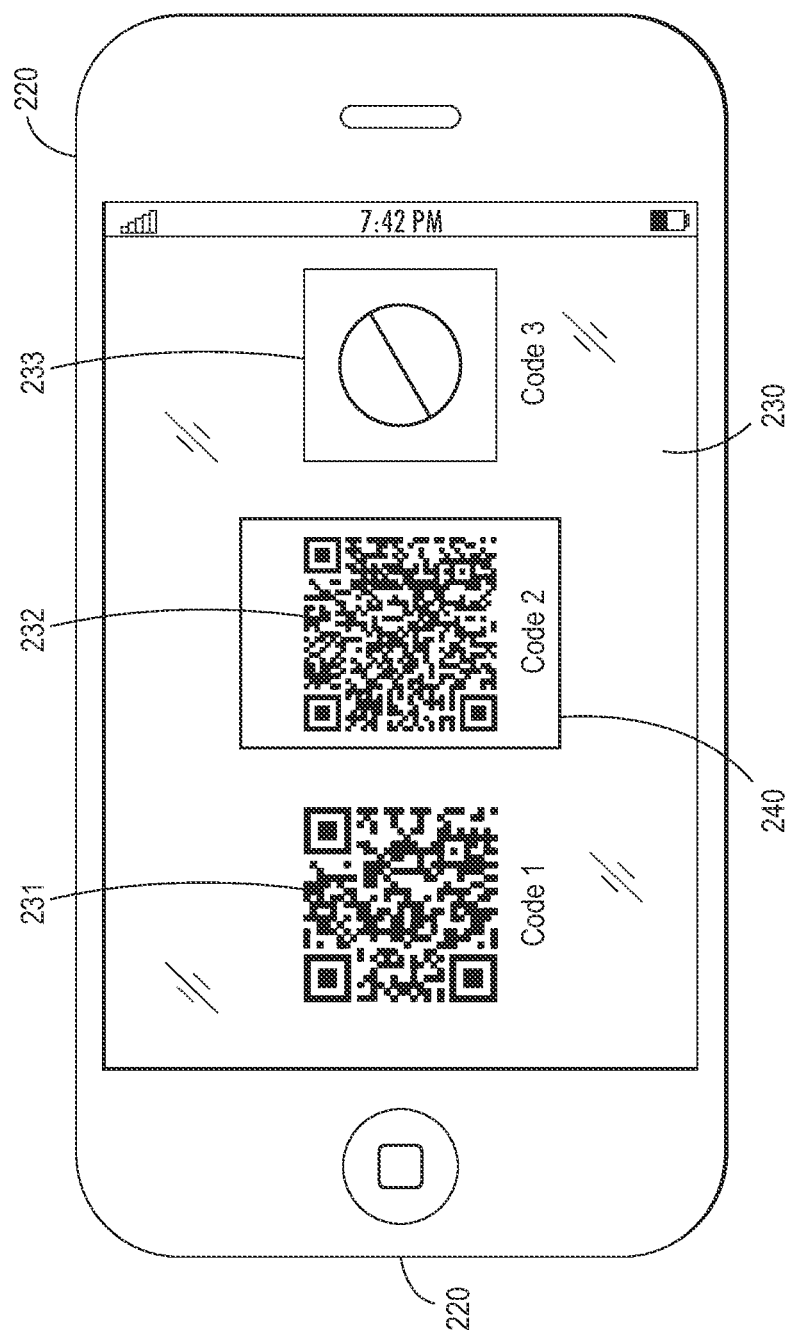
FIG. 2B is a diagram depicting an exemplary display screen of a visual data receiver, consistent with certain disclosed embodiments.

FIG. 2B is a diagram depicting an exemplary display screen of a visual data receiver, consistent with certain disclosed embodiments. As depicted in FIG. 2B, device 220 is a visual data emitter, similar to device 110 in FIG. 1. Device 220 can be connected to display screen 230, similar to display screen 115 in FIG. 1.

As depicted in FIG. 2B display screen 210 is displaying visual representations 231 and 232 of synchronization code sequences from a synchronization video, in this example, visual representations of the synchronization code sequences associated with code sequence frame 211 and code sequence frame 212 in FIG. 2A. In some embodiments, a visual representation of the synchronization code sequences may not be used, and other forms of representing the code sequences can be utilized. Additionally, display screen 210 is displaying image 233, which can be an indication that a synchronization code sequence cannot be processed.

Visual representation 231 can serve as an indication that the synchronization code sequence associated with code sequence frame 211 (i.e. "Code 1") was fully processed by device 220. For example, a video camera integrated with device 220 may be capable of capturing more than 20 frames per second, and may have captured and processed every frame from Code 1. Further, the video camera may have been able to recognize the particular code sequence format used in Code 1.

Visual representation 232 can serve as an indication that the synchronization code sequence associated with code sequence frame 212 (i.e. "Code 2") was fully processed by device 220. For example, the video camera integrated with device 220 may be capable of capturing more than 25 frames per second, and may have captured and processed every frame from Code 2. Further, the video camera may have been able to capture at least standard or medium resolution videos and/or device 220 may have been able to recognize the particular code sequence format used in Code 2.

Image 233 can serve as an indication that the synchronization code sequence associated with code sequence frame 213 (i.e. "Code 3") was not fully processed by device 220. For example, the video camera integrated with device 220 may not be capable of capturing at least 30 frames per second, and, according, was unable to capture and process every frame from Code 3. Further, the video camera may not have been able to capture high resolution videos and could not fully process individual code sequence frames from Code 3. Additionally, device 220 may not have been able to recognize the particular type or version of the code sequence used in Code 3.

Therefore, Code 2 can be an optimal synchronization code sequence for device 220 because Code 2 is the synchronization code sequence with the highest frame rate and/or resolution that was fully processed by device 220. Accordingly, a data code sequence presented based on the frame rate, resolution, and/or format of Code 2 can be presented to device 220 in a shorter amount of time than a data code sequence presented based on the frame rate, resolution, and/or format of Code 1. Additionally, device 220 may not be able to fully process a data code sequence presented using the frame rate, resolution, and/or format of Code 3. Therefore, device 220 can display box 240 over visual representation 232 to indicate to the user that Code 2 is the optimal synchronization code sequence for performing the visual data transmission between device 200 and device 220.

Those skilled in the art will appreciate that the above-described diagram is exemplary only, and additional screen configurations, synchronization code sequences, and visual indicators may be utilized. For example, in some embodiment, more than three synchronization code sequences may be displayed in the synchronization video, and, accordingly, more than three visual indicators may be displayed on display screen 230. Further, device 220 may include functionality that allows a user to scroll through visual indicators on display 230.

Figure 3:
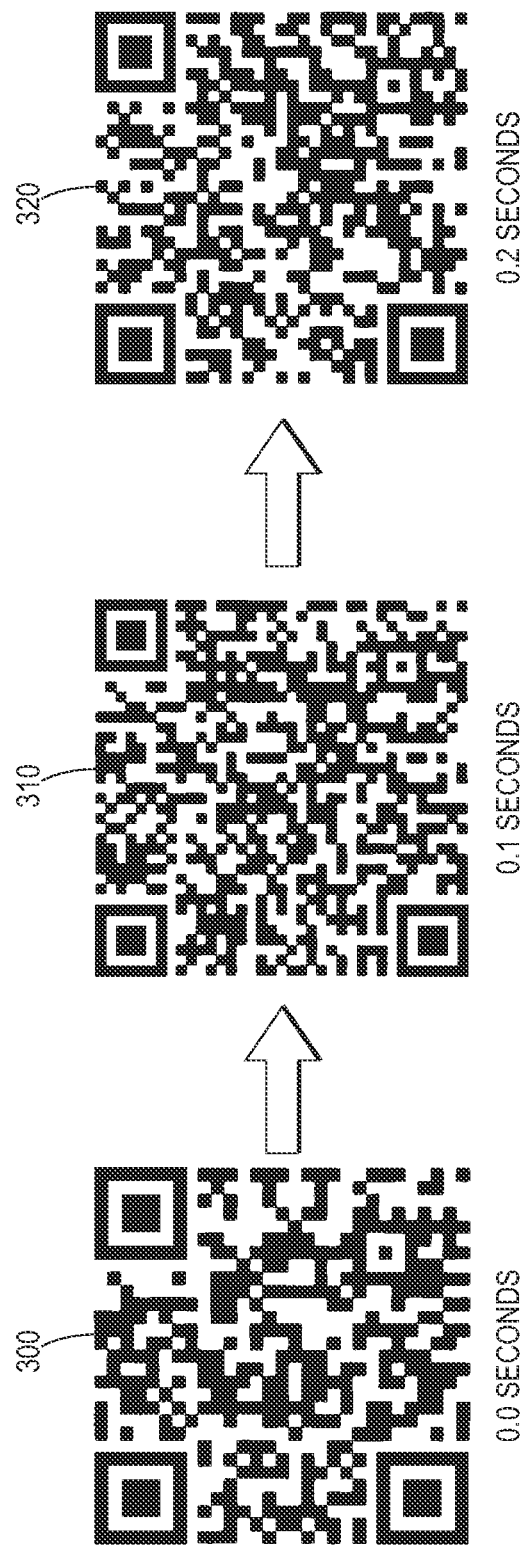
FIG. 3 is a diagram depicting an exemplary sequence of code sequence frames from a single code sequence, consistent with certain disclosed embodiments.

FIG. 3 is a diagram depicting an exemplary sequence of code sequence frames from a single code sequence, consistent with certain disclosed embodiments. As depicted in FIG. 3, a single code sequence can include code sequence frames 300, 310, and 320. In embodiments, the single code sequence can represent a synchronization code sequence or a data code sequence.

A visual data emitter can display code sequence frame 300 at time 0.0 seconds. If the single code sequence is refreshed at 10 frames per second, code sequence frame 300 can be refreshed with code sequence frame 310 at time 0.1 seconds, and code sequence frame 310 can be refreshed with code sequence frame 320 at time 0.2 seconds. Accordingly, the full code sequence can be displayed and potentially captured as a video by a video camera after 0.2 seconds. A visual data receiver can process the video by separating the captured video into frames for each code sequence frame and can separately process and decode each code sequence frame to extract stored data.

In embodiments, each code sequence frame can be a two-dimensional, machine-readable representation of data, such as, but not limited to, a barcode. A barcode can be a linear bar code or a matrix barcode. Examples of matrix barcodes include, but are not limited to, Quick Response Code ("QR Code") and EZcode.

Those skilled in the art will appreciate that the above-described diagram is exemplary only, and different types of code sequence frames, different refresh rates, and/or more or less code sequences frames may be utilized.

Figure 4:
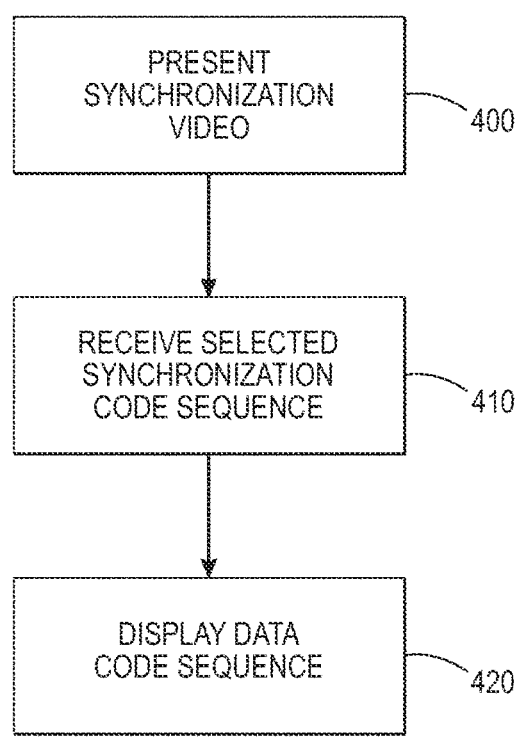
FIG. 4 is a flow diagram illustrating an exemplary method for emitting visual data, consistent with certain disclosed embodiments.

FIG. 4 is a flow diagram illustrating an exemplary method for emitting visual data, consistent with certain disclosed embodiments. The process can begin at 400 when a visual data emitter, such as device 100 from FIG. 1, presents a synchronization video on a display screen. The synchronization video can include one or more synchronization code sequences displayed at different frame rates, at different resolutions, using different formats, or a combination thereof.

In embodiments, a user can capture the synchronization video using a video camera connected to a visual data receiver, and the visual data receiver can determine an optimal synchronization code sequence and indicate the optimal synchronization code sequence to the user.

In further embodiments, only a subset of the one or more synchronization code sequences may be displayed concurrently on the display device. In such embodiments, the visual data emitter can receive instructions from the user to scroll through available synchronization code sequences via, for example, touchscreen functionality of the display device. Accordingly, the visual data emitter can display different subsets of the one or more synchronization code sequences based on the user's selection.

In further embodiments, the user may indicate that no synchronization code sequences are compatible with the visual data receiver. Accordingly, the visual data emitter can select and/or generate new synchronization codes sequences to display on the display device.

In 410, the visual data emitter can receive a selected synchronization code sequence from the user. For example, the selected synchronization code sequence can be the optimal synchronization code sequence determined by the visual data receiver.

In 420, the visual data emitter can display a data code sequence on the display device using the frame rate, resolution, and/or format associated with the selected synchronization code sequence from 410. In embodiments, the data code sequence can represent encoded data that can be used on the visual data receiver. For example, the data can be an audio file that can be played using speakers integrated with the visual data receiver or an image file that can be displayed on a display screen of the visual data receiver.

While the steps depicted in FIG. 4 have been described as performed in a particular order, the order described is merely exemplary, and various different sequences of steps can be performed, consistent with certain disclosed embodiments. Additional variations of steps can be utilized, consistent with certain disclosed embodiments. Further, the steps described are not intended to be exhaustive or absolute, and various steps can be inserted or removed.

For example, in some embodiments, the visual data emitter may continuously loop the synchronization video in 400 or the data code sequence in 420 on the display screen until an input is received from the user or until a set amount of time has elapsed. In further embodiments, the visual data emitter may present the synchronization video or the data code sequence on the display in response to an input from the user that the video camera is ready to capture. Additionally or alternatively to the above embodiments, the visual data emitter may indicate to the user when the synchronization video and/or the data code sequence begins and/or ends.

In further embodiments, the visual data emitter can require credentials, such as, for example, a password, credentials from a Universal Serial Bus flash drive, an Radio-frequency identification signal, credentials from a magnetic key card, or payment from the user before synchronization video and/or the data code sequence is displayed. In still further embodiments, the visual data emitter can generate a user profile for the user associated with the frame rate, resolution, and/or format from the selected synchronization code sequence. Accordingly, on subsequent uses of the visual data emitter, the user may only need to select the user profile to receive a new data code sequence. The new data code sequence can be displayed using the frame rate, resolution, and/or format associated with the user profile.

Figure 5:
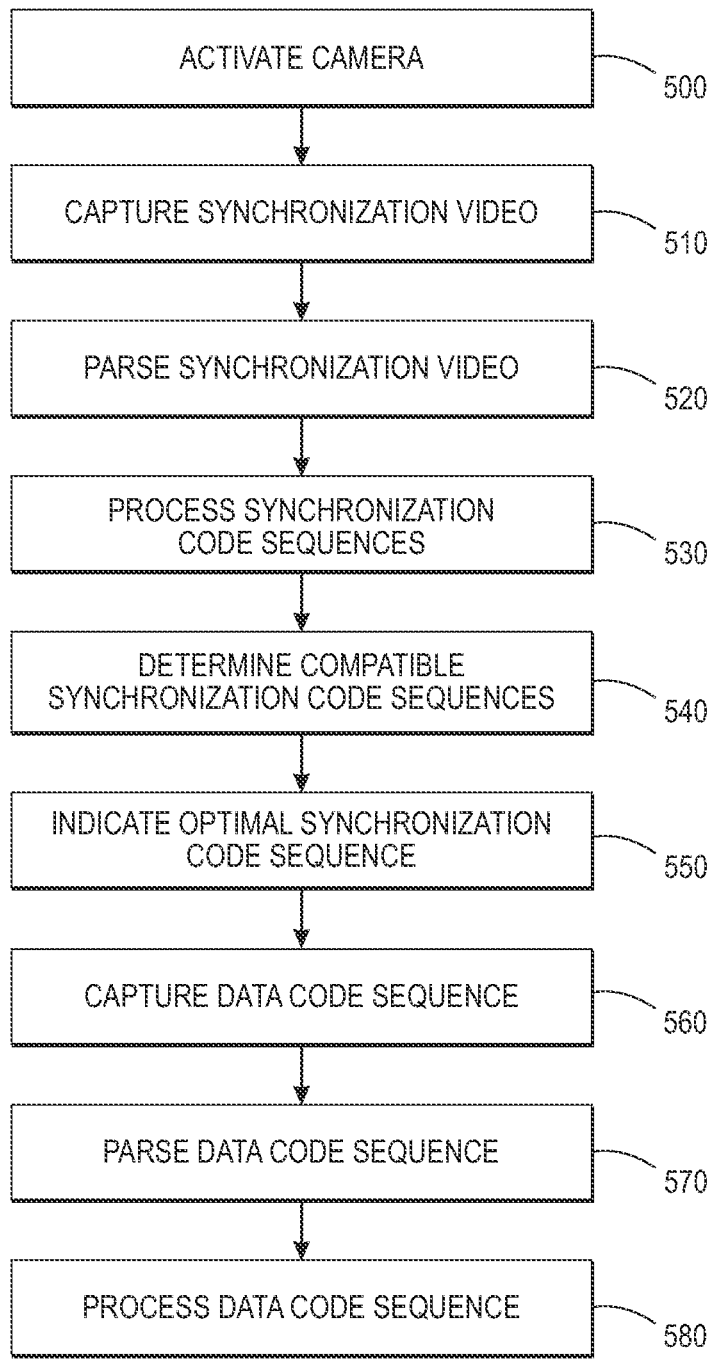
FIG. 5 is a flow diagram illustrating an exemplary method for receiving visual data, consistent with certain disclosed embodiments.

FIG. 5 is a flow diagram illustrating an exemplary method for receiving visual data, consistent with certain disclosed embodiments. The process can begin at 500 when a video camera connected to a visual data receiver is activated. For example, a user can activate a visual data transmission application on the visual data receiver.

At 510, the video camera can capture a video that includes a synchronization video presented by a visual data emitter. The synchronization video can include one or more synchronization code sequences.

At 520, the visual data receiver can parse the synchronization video. In embodiments, the visual data receiver can separate the video into sections based on the locations of each of the one or more synchronization code sequences. The visual data receiver can then individually parse each synchronization code sequence. For example, the visual data receiver can extract a code sequence frame each time a code sequence frame refreshes in the synchronization video.

At 530, the visual data receiver can process each of the one or more synchronization code sequences. For example, the visual data receiver can individually decode each of the code sequence frames extracted in 520. In some embodiments, the visual data receiver can first identify the format of the code sequence frame before decoding the code sequence frame.

In 540, the visual data receiver can determine compatible synchronization code sequences from among the one or more synchronization code sequences. For example, the synchronization code sequences can include a known sequence encoded sequentially into each code sequence frame. The visual data receiver can determine that certain code sequence frames were not captured by the video camera by determining that the full sequence was not captured. Such a determination could indicate that the synchronization code sequence was refreshed at a frame rate that was too high for the video camera and/or visual data receiver. Accordingly, the visual data receiver can determine such a synchronization code sequence is incompatible for visual data transmission. However, if the visual data receiver determines that the full sequence was captured, the visual data receiver can determine that such a synchronization code sequence is compatible for visual data transmission.

As an additional example, once each frame is decoded, the visual data receiver can concatenate data from each code sequence frame from a synchronization code sequence into a single file. If the single file is incomplete or includes errors, the visual data receiver may determine that the synchronization code sequence is incompatible for visual data transmission. However, if the single file is determined to be complete and/or include no errors, the visual data receiver may determine that the synchronization code sequence is compatible for visual data transmission.

Further, in some embodiments, the visual data receiver can determine which of the compatible synchronization code sequences is optimal for visual data transmission. For example, if multiple synchronization code sequences are determined to be compatible for visual data transmission, the visual data receiver can determine that the synchronization code sequence with a higher frame rate is optimal for visual data transmission because a higher frame rate can indicate that the visual data can be transmitted in a shorter amount of time.

As an additional example, if multiple synchronization code sequences are determined to be compatible for visual data transmission, the visual data receiver can determine that the synchronization code sequence that requires a higher resolution camera is optimal for visual data transmission because requiring a higher resolution camera can indicate that more visual data can be transmitted in a single code sequence frame.

In 550, the visual data receiver can indicate to the user which synchronization code sequence is optimal for visual data transmission and/or which of the one or more synchronization code sequences are incompatible with the visual data receiver and/or the video camera. For example, the visual data receiver can indicate an optimal synchronization code sequence and incompatible synchronization code sequences as depicted in FIG. 2 and described above.

In 560, after the user has selected the optimal synchronization code sequence on the visual data emitter, the video camera can capture a second video presented by the visual data emitter. The second video can include a data code sequence.

In 570, the visual data receiver can parse the data code sequence. For example, the visual data receiver can extract a code sequence frame each time a code sequence frame refreshes in the data code sequence video.

In 580, the visual data receiver can process the data code sequence. For example, the visual data receiver can individually decode each of the code sequence frames extracted in 570. In some embodiments, the visual data receiver can first identify the format of the code sequence frame before decoding the code sequence frame. Once each frame is decoded, the visual data receiver can concatenate data from each code sequence frame into a single file. The single file can be stored and/or accessed by the user.

While the steps depicted in FIG. 5 have been described as performed in a particular order, the order described is merely exemplary, and various different sequences of steps can be performed, consistent with certain disclosed embodiments. Additional variations of steps can be utilized, consistent with certain disclosed embodiments. Further, the steps described are not intended to be exhaustive or absolute, and various steps can be inserted or removed.

Figure 6:
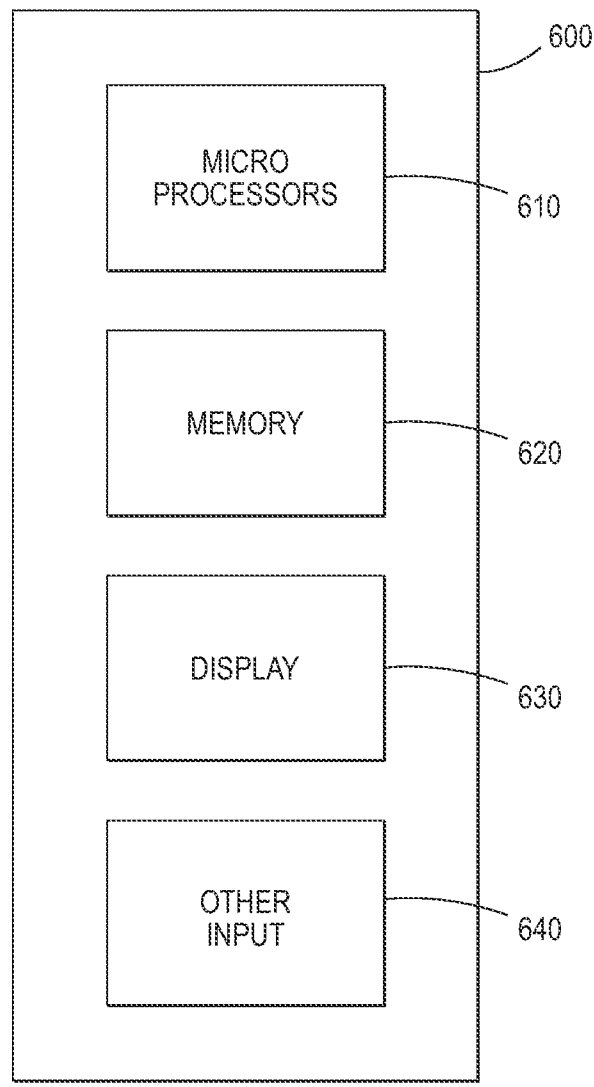
FIG. 6 is a diagram depicting an exemplary computing device capable of emitting visual data, consistent with certain disclosed embodiments.

FIG. 6 is a diagram depicting an exemplary computing device capable of emitting visual data, consistent with certain disclosed embodiments. Computing device 600 may represent any type of one or more computing devices able to output to display 630. For example, computing device 600 can be device 100 from FIG. 1. In embodiments, display 630 can represent any type of one or more visual output devices capable of presenting data in visual form. For example, display 630 can be an LCD screen. Additionally, in some embodiments, display 630 can be integrated with computing device 600, while, in further embodiments, display 630 can be a separate device capable of sending information to and/or receiving information from computing device 600.

Computing device 600 may include, for example, one or more microprocessors 610 of varying core configurations and clock frequencies; one or more memory devices or computer-readable media 620 of varying physical dimensions and storage capacities, such as flash drives, hard drives, random access memory, etc., for storing data, such as images, files, and program instructions for execution by one or more microprocessors 610; one or more transmitters for communicating over network protocols, such as Ethernet, code divisional multiple access (CDMA), time division multiple access (TDMA); other input 640, such as keyboards, mice, touchpads, computer screens, touchscreens, etc., for enabling human interaction with computing device 600; etc. One or more microprocessors 610 and one or more memory devices or computer-readable media 620 may be part of a single device as disclosed in FIG. 6 or may be contained within multiple devices. Further, other input 640 may be integrated as part of a single device as disclosed in FIG. 6 or may be contained within multiple devices. Those skilled in the art will appreciate that the above-described componentry is exemplary only, as computing device 600 may comprise any type of hardware componentry, including any necessary accompanying firmware or software, for performing the disclosed embodiments.

Figure 7:
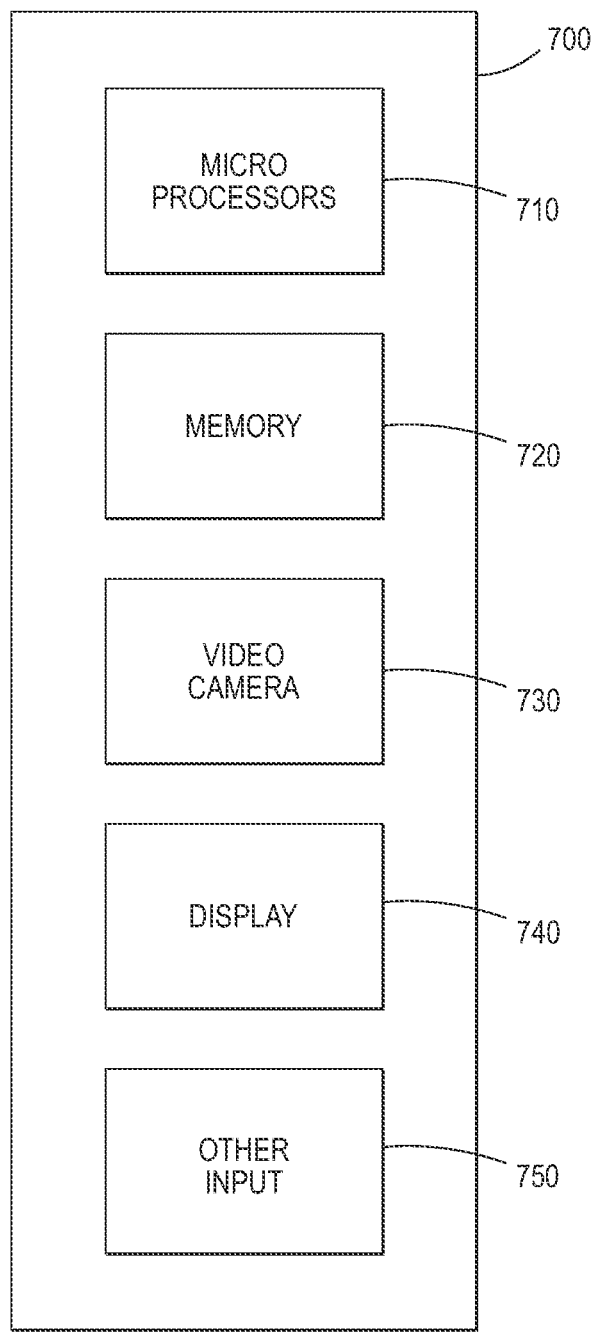
FIG. 7 is a diagram depicting an exemplary computing device capable of receiving visual data, consistent with certain disclosed embodiments.

FIG. 7 is a diagram depicting an exemplary computing device capable of receiving visual data, consistent with certain disclosed embodiments. Computing device 700 may represent any type of one or more computing devices able to receive video data from video camera 730. For example, computing device 700 can be device 110 from FIG. 1. In embodiments, video camera 730 can represent a single video camera or multiple video cameras. In further embodiments, video camera 730 can represent one or more still image cameras, one or more video cameras, or a combination thereof. Additionally, in some embodiments, one or more of video camera 730 can be integrated with computing device 700, while, in further embodiments, one or more of video camera 730 can be a separate device capable of sending to and/or receiving information from computing device 700.

In some embodiments, computing device 700 can additionally output and/or receive data via display 740. Display 740 can represent any type of one or more visual output devices capable of presenting data in visual form. For example, display 740 can be an LCD screen. Additionally, in some embodiments, display 740 can be integrated with computing device 700, while, in further embodiments, display 740 can be a separate device capable of sending to and/or receiving information from computing device 700.

Computing device 700 may include, for example, one or more microprocessors 710 of varying core configurations and clock frequencies; one or more memory devices or computer-readable media 720 of varying physical dimensions and storage capacities, such as flash drives, hard drives, random access memory, etc., for storing data, such as images, files, and program instructions for execution by one or more microprocessors 710; one or more transmitters for communicating over network protocols, such as Ethernet, code divisional multiple access (CDMA), time division multiple access (TDMA); other input 750, such as keyboards, mice, touchpads, computer screens, touchscreens, etc., for enabling human interaction with computing device 700; etc. One or more microprocessors 710 and one or more memory devices or computer-readable media 720 may be part of a single device as disclosed in FIG. 7 or may be contained within multiple devices. Further, other input 750 may be integrated as part of a single device as disclosed in FIG. 7 or may be contained within multiple devices. Those skilled in the art will appreciate that the above-described componentry is exemplary only, as computing device 700 may comprise any type of hardware componentry, including any necessary accompanying firmware or software, for performing the disclosed embodiments.

What is claimed is:

1. A method of transmitting visual data, the method comprising:
   displaying a synchronization video comprising one or more synchronization code sequences, wherein each of the one or more synchronization code sequences is displayed at a one or more of a different frame rate, a different resolution, and a different format;
   receiving a selected synchronization code sequence of the one or more synchronization code sequences; and
   displaying, using one or more processors, a data code sequence corresponding to the selected synchronization code sequence, wherein the data code sequence comprises encoded data.

2. The method of claim 1, wherein a subset of the one or more synchronization code sequences are displayed concurrently, the method further comprising:
   receiving an input to scroll through available synchronization code sequences;
   and
   displaying a different subset of the one or more synchronization code sequences based on the input.

3. The method of claim 1, wherein each synchronization code sequence of the one or more synchronization code sequences is repeatedly looped in the synchronization video.

4. The method of claim 1, wherein the data code sequence is displayed using a frame rate corresponding to the selected synchronization code sequence, a resolution corresponding to the selected synchronization code sequence, a format corresponding to the selected synchronization code sequence, or a combination thereof.

5. The method of claim 1, the method further comprising displaying an indication that at least one of the one or more synchronization code sequences is beginning.

6. The method of claim 1, wherein displaying the synchronization video is in response to an input from a user.

7. The method of claim 1, wherein the encoded data is a file selected by a user.

8. A method of transmitting visual data, the method comprising:
   capturing a synchronization video comprising one or more synchronization code sequences using a video camera;
   parsing and decoding the one or more synchronization code sequences;
   determining, using one or more processors, which of the one or more synchronization code sequences are compatible for visual data transmission based on decoding the one or more synchronization code sequences, wherein determining that a synchronization code sequence is compatible for visual data transmission comprises determining that there are no errors in decoding the synchronization code sequence;
   displaying an indication of which of the one or more synchronization code sequences are compatible for visual data transmission;
   capturing a data code sequence using the video camera; and
   decoding the data code sequence.

9. The method of claim 8, the method further comprising:
   determining which of the one or more synchronization code sequences is optimal for visual data transmission based on decoding the one or more synchronization code sequences; and
   displaying an indication of which of the one or more synchronization code sequences is optimal for visual data transmission.

10. The method of claim 9, wherein determining which of the one or more synchronization code sequences is optimal for visual data transmission comprises determining that the synchronization code sequence uses a higher frame rate compared to other synchronization code sequences, requires a higher resolution camera compared to other synchronization code sequences, or a combination thereof.

11. The method of claim 9, wherein determining that a synchronization code sequence is compatible for visual data transmission comprises determining that the video camera captured a complete set of code sequences frames for the synchronization code sequence.

12. A system for transmitting visual data comprising:
   a processing system comprising one or more processors; and
   a memory system comprising one or more computer-readable media, wherein the one or more computer-readable media contain instructions that, when executed by the processing system, cause the processing system to perform operations comprising:
      displaying a synchronization video comprising one or more synchronization code sequences, wherein each of the one or more synchronization code sequences is displayed at a one or more of a different frame rate, a different resolution, and a different format;
      receiving a selected synchronization code sequence of the one or more synchronization code sequences; and displaying a data code sequence corresponding to the selected synchronization code sequence, wherein the data code sequence comprises encoded data.

13. The system of claim 12, wherein a subset of the one or more synchronization code sequences are displayed concurrently, the processing system further performs operations comprising:

receiving an input to scroll through available synchronization code sequences; and displaying a different subset of the one or more synchronization code sequences based on the input.

14. The system of claim 12, wherein each synchronization code sequence of the one or more synchronization code sequences is repeatedly looped in the synchronization video.

15. The system of claim 12, wherein the data code sequence is displayed using a frame rate corresponding to the selected synchronization code sequence, a resolution corresponding to the selected synchronization code sequence, a format corresponding to the selected synchronization code sequence, or a combination thereof.

16. The system of claim 12, the processing system further performs operations comprising displaying an indication that at least one of the one or more synchronization code sequences is beginning.

17. The system of claim 12, wherein displaying the synchronization video is in response to an input from a user.

18. The system of claim 12, wherein the encoded data is a file selected by a user.

\* \* \* \* \*